United States Patent
Lau

(10) Patent No.: US 6,353,544 B1
(45) Date of Patent: Mar. 5, 2002

(54) FLYBACK CONVERTER WITH SYNCHRONOUS RECTIFIER

(75) Inventor: Chi-Sang Lau, Taipei (TW)

(73) Assignee: Hua-In Co., Ltd. (TW)

( * ) Notice: Subject to any disclaimer, the term of this patent is extended or adjusted under 35 U.S.C. 154(b) by 0 days.

(21) Appl. No.: 09/812,585

(22) Filed: Mar. 21, 2001

(30) Foreign Application Priority Data

Jul. 27, 2000 (TW) ........................................ 89114974 A

(51) Int. Cl.$^7$ ............................................. H02M 3/335
(52) U.S. Cl. .................................. 363/21.14; 363/21.12
(58) Field of Search ........................ 363/16, 20, 21.01, 363/21.12, 21.14, 55, 56.01, 56.09, 56.1, 95, 97, 131

(56) References Cited

U.S. PATENT DOCUMENTS

| | | | |
|---|---|---|---|
| 5,991,171 A | * 11/1999 | Cheng | .......................... 363/21 |
| 5,991,172 A | * 11/1999 | Jovanovic et al. | ............ 363/21 |
| 6,064,580 A | * 5/2000 | Watanabe et al. | .............. 363/17 |
| 6,185,114 B1 | * 2/2001 | Matsumoto et al. | .......... 363/21 |
| 6,246,593 B1 | * 6/2001 | Cheng | .......................... 363/17 |

* cited by examiner

Primary Examiner—Matthew Nguyen
(74) Attorney, Agent, or Firm—Troxell Law Office PLLC

(57) ABSTRACT

The present invention is related to a flyback converter with synchronous rectifier, and to use the current sensor coupled with the synchronous rectifier to detect the secondary current of the transformer. Using the secondary current, this invention could control the pulse width of the output signal from the synchronous rectifier to make the diode turn on in the same time with the synchronous switch. This invention could improve the power efficiency of the power supply and avoid the secondary current flows back, and simplify the circuit design to make the production much easier to cost down.

11 Claims, 11 Drawing Sheets

FLYBACK CONVERTER WITH SYNCHRONOUS RECTIFIER

BACKGROUND OF THE INVENTION

1. Field of the Invention

The present invention relates to a flyback converter with synchronous rectifier to simply the circuit design, and improves the power efficiency by using a current sensor to detect the secondary current of the transformer to control the duty cycle of the synchronous switch.

2. Background of the Invention

Recently, the technique of the switching power supply is getting more progress. Operating in coordination with the variation of the circuit topology, the switching power supply has been an essential technique in the computer and electronic equipment power source. The switching power supply is a popular device because it provides the power source with the stability, compactness, efficiency and the lower cost for computer, rather than the traditional linear transformer circuit.

In the switching power supply area, the synchronous rectify method has been use for many years. Generally, the synchronous rectify method is almost applied in the forward converter or the resonant converter. FIG. 1 is the prior art U.S. Pat. No. 5,991,171, uses the synchronous rectify technique. The Synchronous rectifier control 122 connected in the secondary circuit of a forward DC-to-DC converter, not in a flyback converter.

FIG. 2 is the prior art U.S. Pat. No. 5,991,172, presents a flyback converter reduced the turn-on switching losses in a single stage by using a zero-crossing detector device to control the SW operation. Obviously, FIG. 2 is not using the synchronous rectify technique in the flyback converter. The main disadvantage of U.S. Pat. No. 5,991,172 is more complex circuit design to drive the SW. On the other hand, the zero-crossing detector device equipped for the primary circuit and the feedback signal was the divided voltage. The present invention would be very different from FIG. 2 by controlling the current feedback level and detecting the secondary current with synchronous rectifier in the flyback converter.

As mention above, it is obviously that the synchronous rectifier never be applied into the flyback converter. The reason is that the characteristic of the flyback circuit is often interrupted by the parasitic capacitor and leaking inductance operation to make the current switching waveform more complex. The parasitic capacitor and leaking inductance interruption result in getting the synchronous control signal hardly, so there is not use the synchronous rectifier in the flyback converter. Further, some producers use much more complex controlling method to control the switch in good performance. But the flyback switching power supply is using extensively with the consideration of the low price and the simplificative circuit design. We should not use the complex controlling method in the flyback converter. Then this invention would provide the flyback converter with low cost and simplified circuit design.

SUMMARY OF THE INVENTION

The present invention relates to a flyback converter with synchronous rectifier by using the current sensor coupled with the synchronous rectifier to detect the secondary current of the transformer. Using the secondary current, this invention could control the pulse width of the output signal from the synchronous rectifier circuit to make the synchronous switch turn on in the same time with the diode. It also means the duty cycle of the synchronous switch driving signal can be controlled by the current feedback. The synchronous rectifier could reduce the component stress of the diode coupled with the synchronous switch.

The primary objection of this invention is to provide a flyback converter that improves the power consumption efficiency of the power supply and to avoid the secondary current flows back. This invention further simplifies the circuit design to make the production much easier, so the circuit production can be cost down rather than the traditional flyback converter.

In order to achieve the purpose described above, the flyback converter with synchronous rectifier in this invention embodiment comprising a power source which provide the power for the flyback converter. The power source coupled to a flyback switch circuit for switching, then output a high frequency pulse to a transformer. The transformer has a primary coil coupled to the flyback switch circuit to receive the high frequency pulse, and has two secondary coils for one is master source and the other is sub-source. The sub-source is connected to a synchronous rectifier via a diode D1 to provide power for synchronous rectifier circuit. The synchronous rectifier output is a driving pulse. The driving pulse would drive a synchronous switch that is parallel coupled with an output diode. The output diode is placed between the master source and the load. The load further connects with an output capacitor in parallel. There is also a current sensor coupled to the load in series connection to detect the load current, further the current sensor transmitted the load current into the synchronous rectifier for comparing with a preset current level to regular the driving pulse to meet what we need.

Wherein, the current sensor detect the load current to make the synchronous rectifier output a regulated driving pulse when the output diode is on, then the synchronous switch turn on with the output diode simultaneously to bypass the current of output diode for reducing the component stress and switching loss.

For the preferred embodiment, further including a promoted turn on/off path coupled between the sub-source and the gate electrode of synchronous switch. The path includes a quickly turn on diode D5 connected with a quickly turn off diode D6, and the quickly turn on diode D5 coupled with a capacitor C5 in parallel connection. In the meantime, the preferred embodiment further including a buffer consisted of an N-type transistor Qn connected with a P-type transistor Qp. Both the base electrodes of the Qn and Qp are connected together then coupled to the output of the synchronous rectifier. Both the emitter electrodes of the Qn and Qp are also connected together then coupled to Vs and to the gate electrode of synchronous switch. The collector electrode of Qn coupled to the node N to connect with the promoted turn on/off path, the collector electrode of Qp coupled to the Vt.

Wherein the promoted turn on path consists of the diode D5, capacitor C5, Qn and the gate of the M1 used to form a quickly charging circuit for the synchronous switch M1. The promoted turn off path consists of the diode D6, capacitor C5 used to form a quickly discharging circuit for the synchronous switch M1.

BRIEF DESCRIPTION OF THE DRAWINGS

The foregoing features of the present invention may be more fully understood from the following detailed description, read in conjunction with the accompanying drawings, wherein.

DETAILED DESCRIPTION OF THE PREFERRED EMBODIMENT

The present invention relates to a flyback converter with synchronous rectifier by using the current sensor coupled with the synchronous rectifier to detect the secondary current of the transformer. Using the secondary current, this invention could control the pulse width of the output signal from the synchronous rectifier circuit to make the synchronous switch turn on in the same time with the diode. It also means the duty cycle of the synchronous switch driving signal can be controlled by the current feedback. The synchronous rectifier could reduce the component stress of the diode coupled with the synchronous switch.

Figure 1:
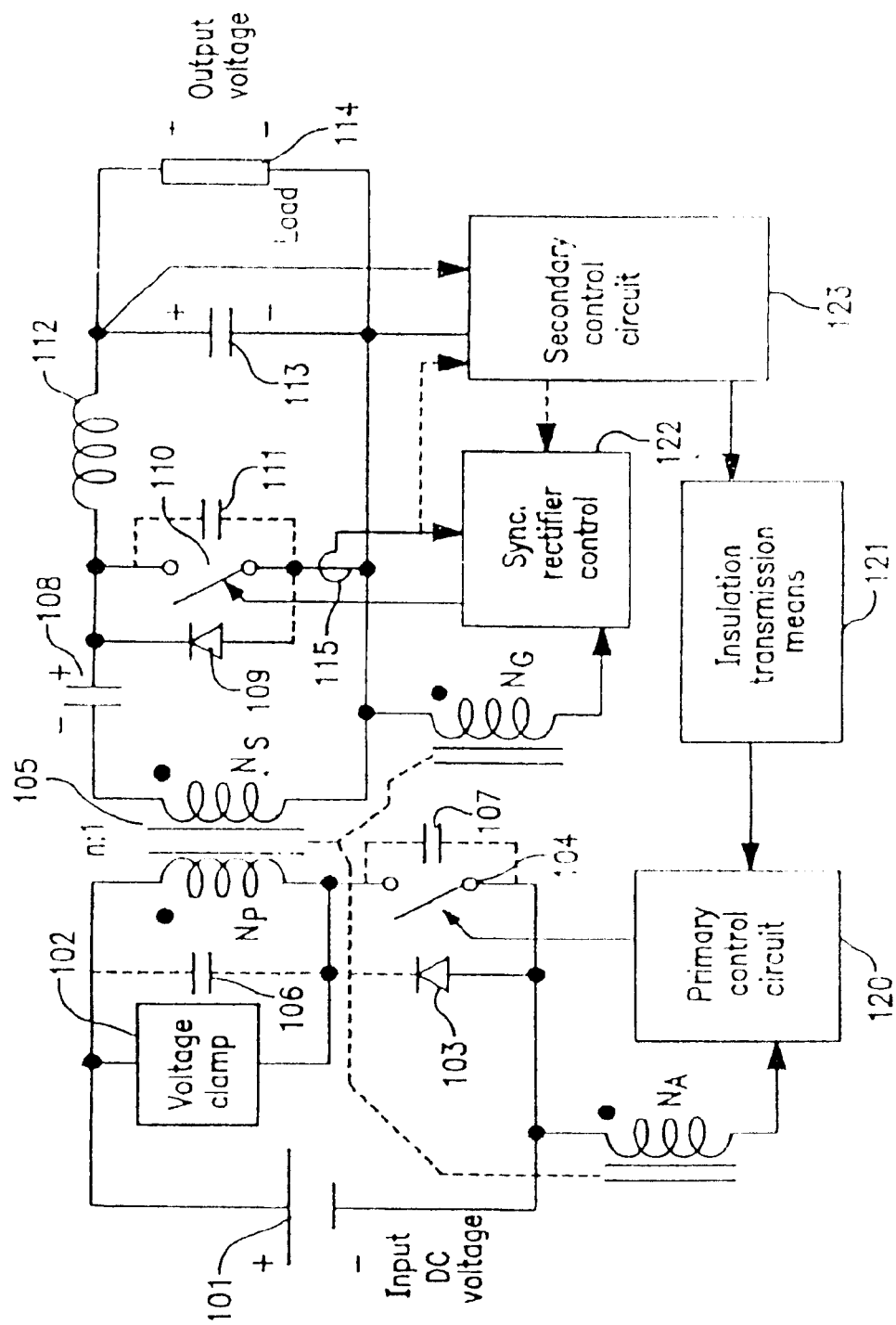
FIG. 1 is a schematic illustration of the prior art of the conventional forward DC-to-DC converter of U.S. Pat. No. 5,991,171.
Figure 2:
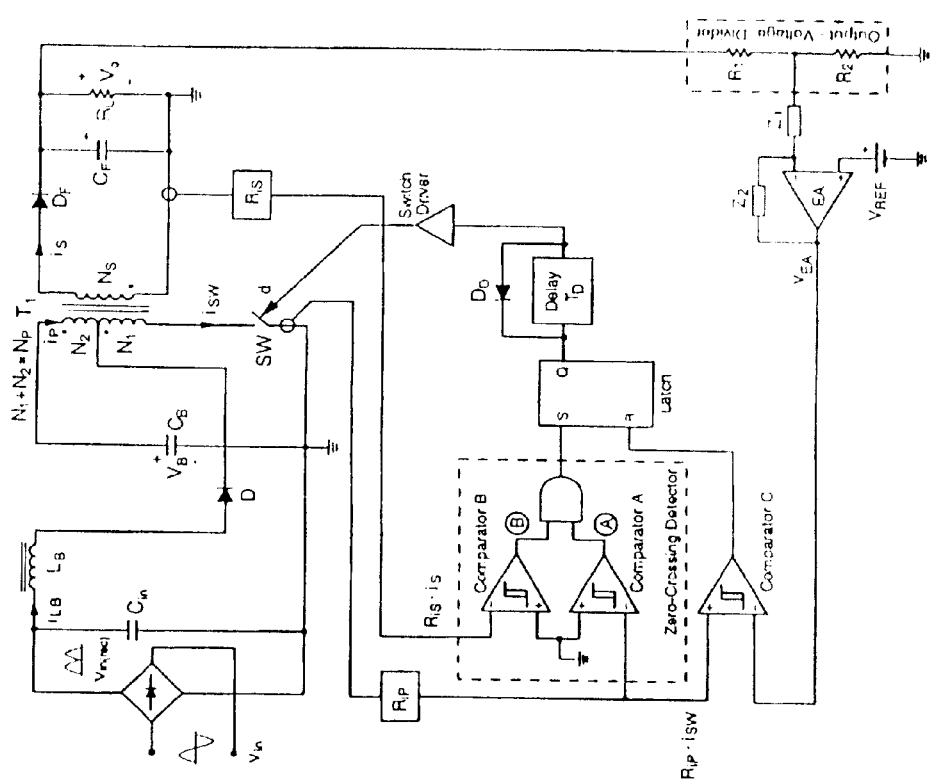
FIG. 2 is a schematic illustration of the prior art of the conventional flyback converter by using a zero-crossing detector device to control the SW operation of U.S. Pat. No. 5,991,172.
Figure 3:
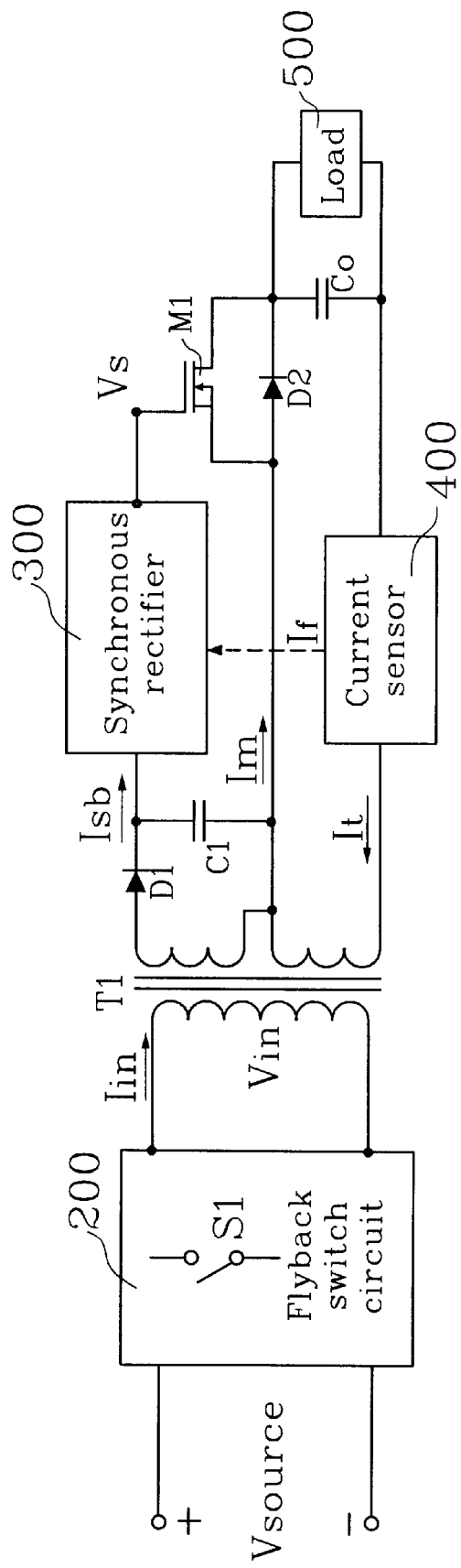
FIG. 3 is a schematic illustration of the first embodiment according to the present invention.

The basic concept of the flyback converter with synchronous rectifier of first embodiment according to this invention is shown in FIG. 3. The flyback converter comprising a power source Vsource which provide the power for the flyback converter and the Vsource is a DC source. The power source coupled to a flyback switch circuit 200 for switching and outputting a high frequency pulse Vin (the current is Iin) to a transformer T1. In the flyback switch circuit 200, includes a switch S1 to switch on/off with high frequency. In the basic flyback converter topology, the transformer T1 is the main transformer to transfer the energy of the primary coil into the secondary coil. In FIG. 3 the transformer T1 has the primary coil coupled to the flyback switch circuit 200 to receive the high frequency pulse Vin. The transformer T1 also has two secondary coils for one is master source Vt (the current is Im, the $I_t$ is the total current) and the other is sub-source Vsb (the current is Isb).

The sub-source Vsb is connected to a synchronous rectifier 300 via a diode D1 to provide the power of the synchronous rectifier 300 which output a synchronous driving pulse Vs. In this embodiment, the synchronous rectifier 300 could be achieved by using a comparator IC. The synchronous driving pulse Vs would drive a synchronous switch M1 to be turned on simultaneously with the output diode D2. The synchronous switch M1 is parallel coupled with an output diode D2. According to the first embodiment, the synchronous switch M1 is accomplished by using an N-type MOSFET. The output diode D2 is placed between the master source Vt and the load 500. The load 500 further connects with an output capacitor Co in parallel.

There is also a current sensor 400 coupled to the load 500 in series connection to detect the load current. Further, the current sensor 400 transmitted the load current into the synchronous rectifier 300 by current $I_f$ for comparing with a preset current level Ib to regular the synchronous driving pulse to meet what we need. Considering the circuit design simplified and cost down, this invention use a CT device to accomplish the current sensor, further, another way to accomplish the current sensor is used the Hall effect element or resistance to detect the load current.

Wherein, the current sensor 400 detect the load current to make the synchronous rectifier 300 output a regulated synchronous driving pulse Vs when the output diode D2 is on. Afterward, the synchronous switch M1 turn on with the output diode D2 simultaneously to bypass the current of output diode D2 for reducing the component stress and switching loss. This could achieve the main pursers of efficient promoted and circuit design simplified for a flyback converter power supply.

Figure 4:
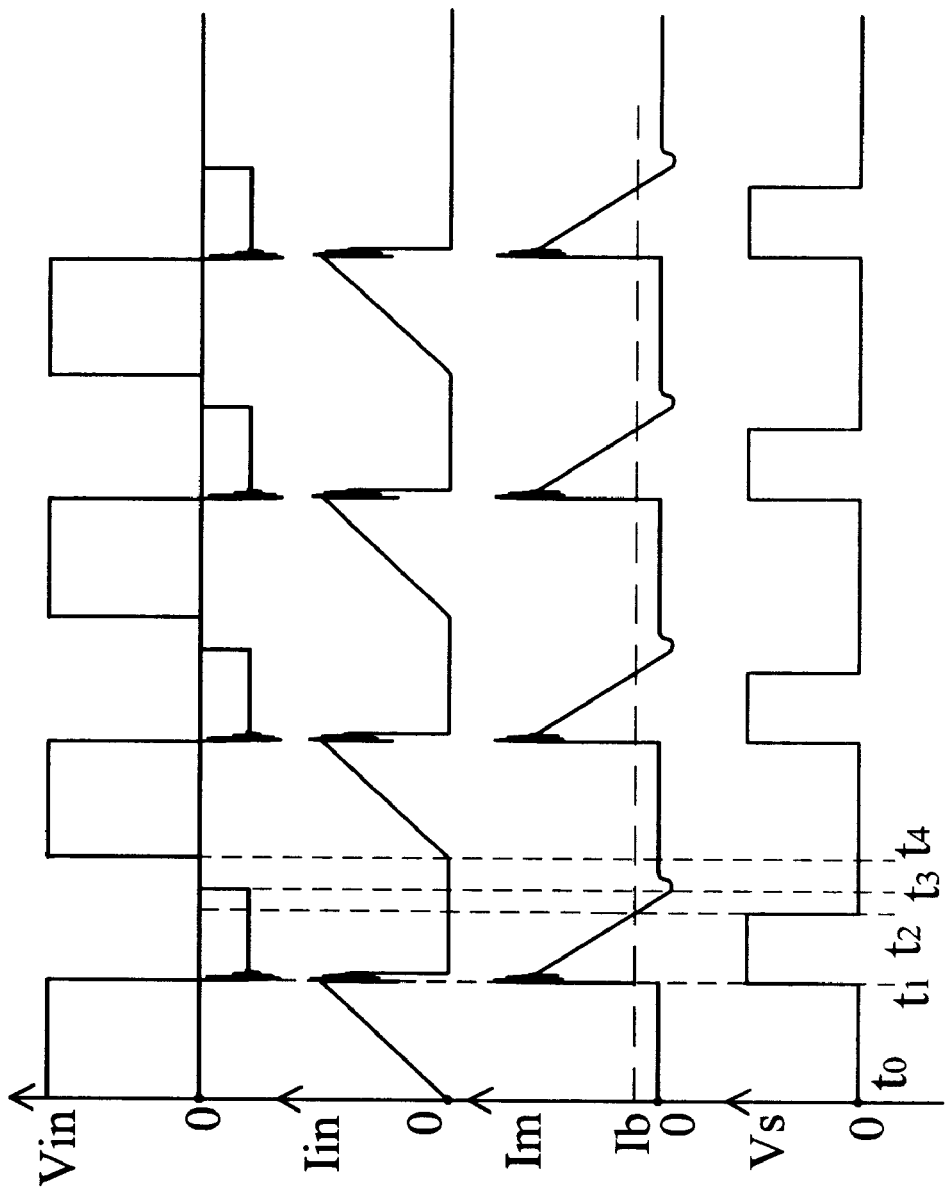
FIG. 4 is a schematic illustration of the waveforms in discontinuous conduction mode (DCM) corresponded to the main elements in FIG. 3 according to the first embodiment in the present invention.

Please referring to FIG. 4, is a schematic illustration of the waveforms in discontinuous conduction mode (DCM) corresponded to the main elements in FIG. 3 according to the first embodiment in the present invention. In the section $t_0-t_1$, the switch S1 in the flyback switch circuit 200 is in turn on state, the Vin is high level, the primary current Iin is increased linearly. In the section $t_1-t_2$, the switch S1 is in turn off state, the primary current Iin is down to zero, the energy in the primary coil of T1 be transferred into the secondary coil to make the current Im be a high level current immediately. In actually, the transitions result in damping oscillations shown in FIG. 4. This invention use the synchronous rectifier for comparing current level to delete the wrong operation caused from the damping oscillations by using the synchronous driving pulse Vs. When the current Im is transited from zero into high level, the Vs will be transited from zero to high level to make the synchronous switch turned on simultaneously with output diode D2.

In section $t_1-t_2$, the current Im is decreased linearly until into zero. Meanwhile, because Im It, the current sensor 400 detects the current Im whether under the preset level Ib or not. If Im<Ib, the Vs will be zero immediately. Therefore, the pulse width of Vs can be adjusted by comparing the Im with Ib then to do synchronous control. Further, the synchronous switch M1 can be modulated in simultaneously turned on with output diode D2, that is the synchronous switch M1 could bypass the turn on current of D2. Under the body resistor of the MOSFET is low, the cross voltage of D2 would be decreased substantially, and reduce the component stress and switching loss.

Figure 5:
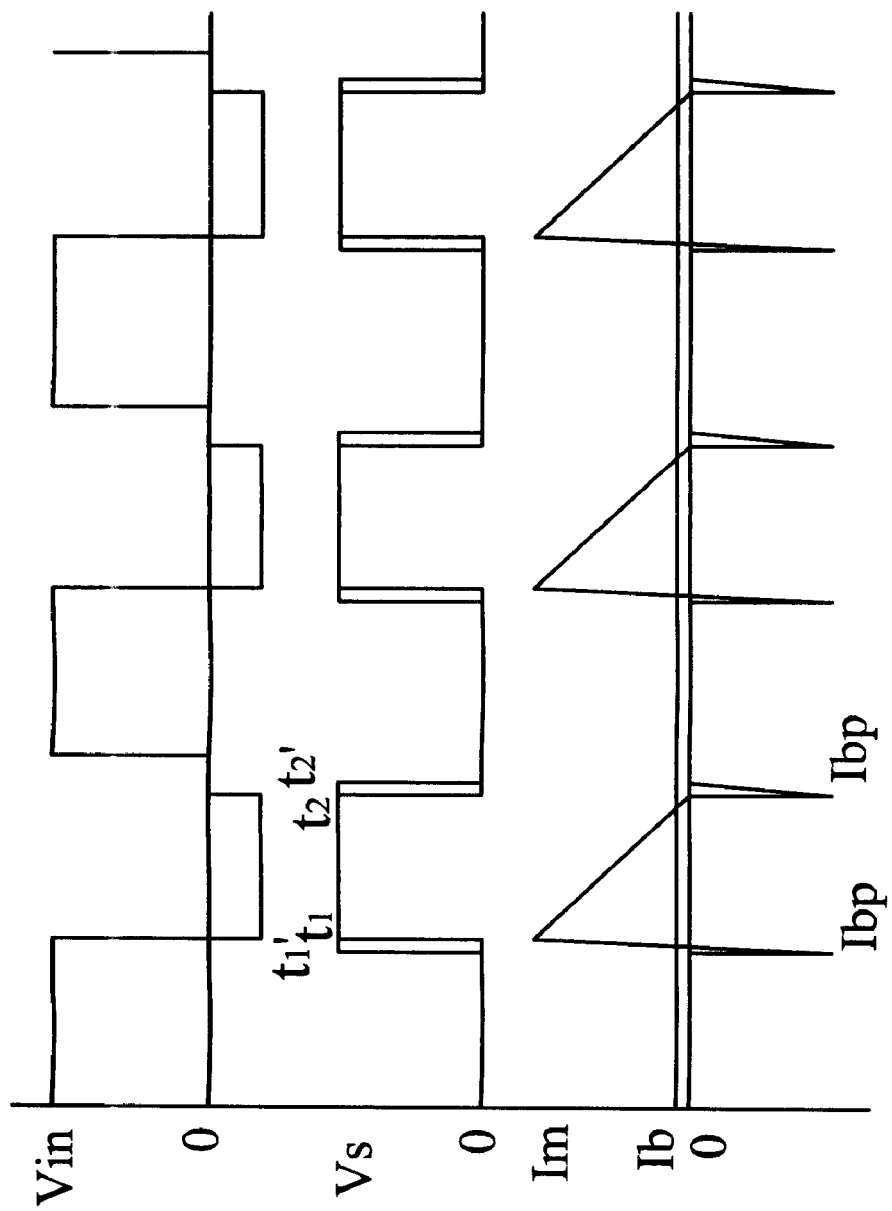
FIG. 5 is a schematic illustration of the more detail waveforms corresponded to the synchronous switch in FIG. 3 according to the first embodiment in the present invention.

Referring to FIG. 5, is a schematic illustration of the more detail waveforms corresponded to the synchronous switch in FIG. 3 according to the first embodiment in the present invention. The current Im output in the section $t_1-t_3$. If the synchronous switch turn on in the section $t_1'-t_2,'$ the current Im will produce the back current Ibp phenomenon. The back current Ibp will consume the power source and make more dangerous, and that is the difficulty of the prior art. In the prior art, the flyback converter could not produce an exactly synchronous control signal with the current Im. Then the synchronous switch of MOSFET is turned on/off incompletely, further results in wrong operation and more power consumption. It is important that the period of modified Vs must less then $t_1$–$t_3$ period to make sure the synchronous switch in normal operation.

It is obvious that this invention improve the disadvantage of the prior art by using the current level comparing to make the synchronous driving pulse exactly in the section $t_1$–$t_2$.

Figure 6:
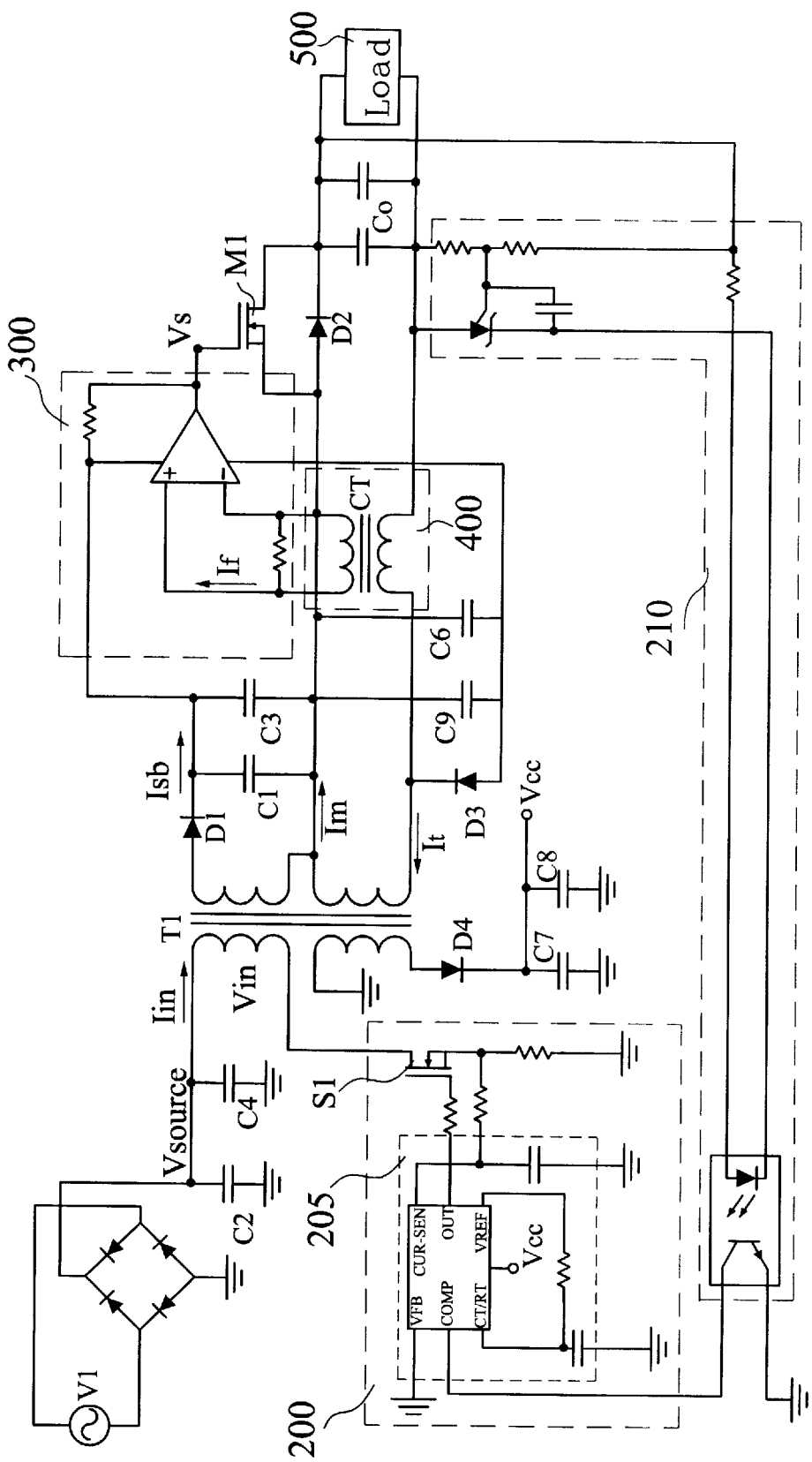
FIG. 6 is a schematic illustration of the more detail circuit elements connection corresponded to the first embodiment in the present invention.

In order to get more detail circuit disclosing for the first embodiment, referring FIG. 6, is a schematic illustration of the more detail circuit element connection corresponded to the first embodiment in the present invention. It shows the Vsource is from the output of bridge rectifier that rectifying the utility power. The gate control circuit 205 controls the switch S1 of the flyback switch circuit 200. For example in the first embodiment, the gate control circuit 205 can be a gate control IC as MC3844A. Further the gate control circuit 205 also connects with a load feedback circuit 210 for gate driving control. The first embodiment uses a CT device to accomplish the current sensor 400, further, another way to accomplish the current sensor 400 is used the Hall effect element to detect the load current. For the synchronous switch 300, it can be a comparing IC likes as the LM311 chip.

In order to make sure the first embodiment in good performance, this invention has taken an experiment for a flyback converter power supply under 12V and 60W output power. The experiment result is to promote the power efficient from 81% to 89% by using this invention.

In another consideration, we hope the circuit in FIG. 3 is still in good performance under the continuous conduction mode (CCM). That is to modulates the first embodiment to be more suitable applied in CCM, especially about the synchronous switch turned off as soon as possible to avoid the switching delay and loss. A second embodiment is used to apply in the CCM to decrease the switching loss and avoid the switching delay. Furthermore, the synchronous switch of the second embodiment is turned on sooner than the first embodiment. So the second embodiment is suitably applied both in the DCM and CCM.

Figure 7:
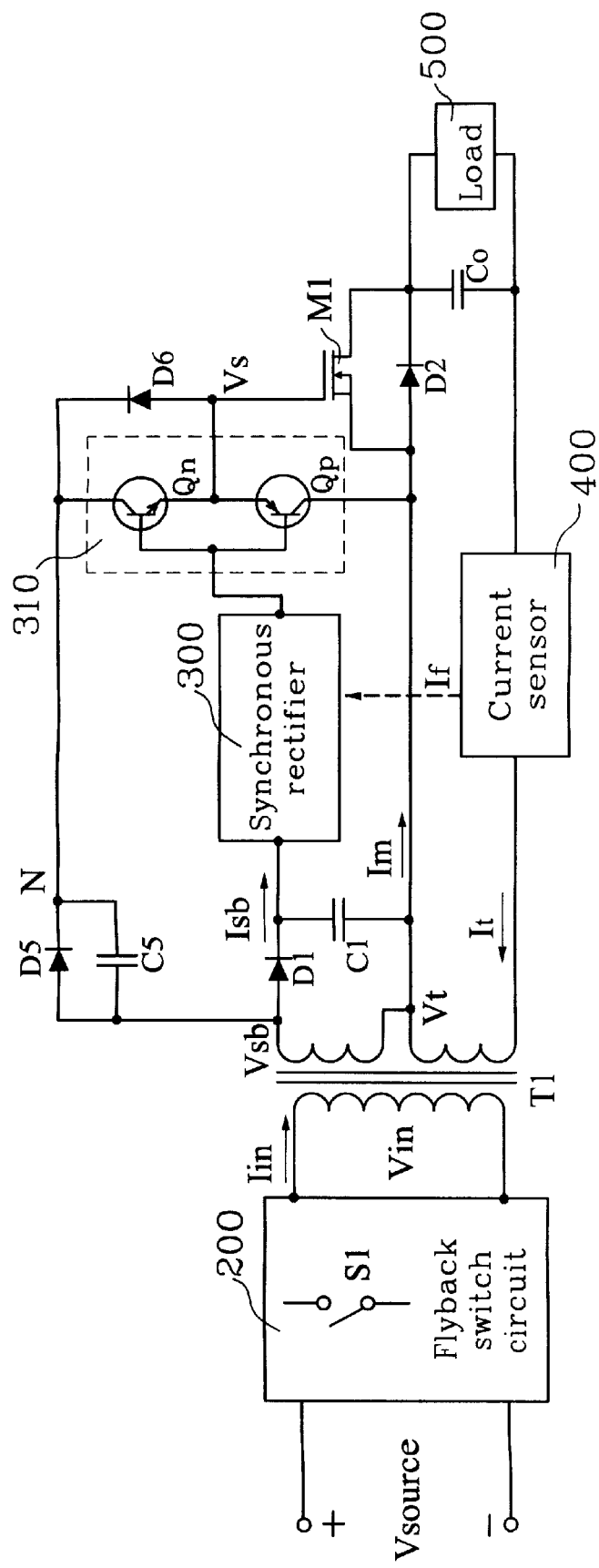
FIG. 7 is a schematic illustration of the second embodiment according to the present invention.

Referring FIG. 7, is a schematic illustration of the second embodiment according to the present invention. The main difference between FIG. 3 and FIG. 7 is the second embodiment further including a buffer 310 and a promoted turn on/off path (D5, C5, and D6). The promoted turn on/off path coupled between the sub-source Vsb and the gate electrode of synchronous switch M1 (the point Vs). The path included a quickly turn on diode D5 connected with a quickly turn off diode D6, and the quickly turn on diode D5 also coupled with a capacitor C5 in parallel connection. The buffer 310 is consisted of an N-type transistor Qn connected with a P-type transistor Qp. Both the base electrodes of the Qn and Qp are connected together, then coupled to the output of the synchronous rectifier 300. Both the emitter electrodes of the Qn and Qp are also connected together and then coupled to Vs. The Vs is a synchronous driving pulse, coupled to the gate electrode of synchronous switch M1. The collector electrode of Qn coupled to the node N to connect with the promoted turn on/off path, and the collector electrode of Qp coupled to the Vt.

Wherein, the promoted turn on path is consisted of the diode D5, capacitor C5, Qn and the gate of the M1. The turn on path is used to form a quickly charging circuit for the synchronous switch M1. The promoted turn off path is consisted of the diode D6 and capacitor C5, and used to form a quickly discharging circuit for the synchronous switch M1.

The other circuit elements in FIG. 7 are almost the same as FIG. 3. For example: a power source Vsource which provide the power for the flyback converter. The power source coupled to a flyback switch circuit 200 for switching then output a high frequency pulse Vin (the current is Iin) to a transformer T1. The transformer T1 has a primary coil coupled to the flyback switch circuit to receive the high frequency pulse, and has two secondary coil for one is master source Vt (the main current is Im, the total current is $I_t$) and the other is sub-source Vsb (the current is Isb). The sub-source Vsb is connected to a synchronous rectifier 300 via a diode D1 to provide the power of the synchronous rectifier 300 which can output a driving pulse. The driving pulse coupled to the buffer 310 then output a synchronous driving pulse Vs to drive the synchronous switch M1. The switch M1 is parallel coupled with an output diode D2. The output diode D2 is placed between the master source Vt and the load 500. The load 500 further connects with an output capacitor Co in parallel. There is also a current sensor 400 coupled to the load 500 in series connection to detect the load current. Further, the current sensor 400 transmitted the load current to be $I_f$ and into the synchronous rectifier 300 for comparing with a preset current level to regular the driving pulse to meet what we need.

Figure 8:
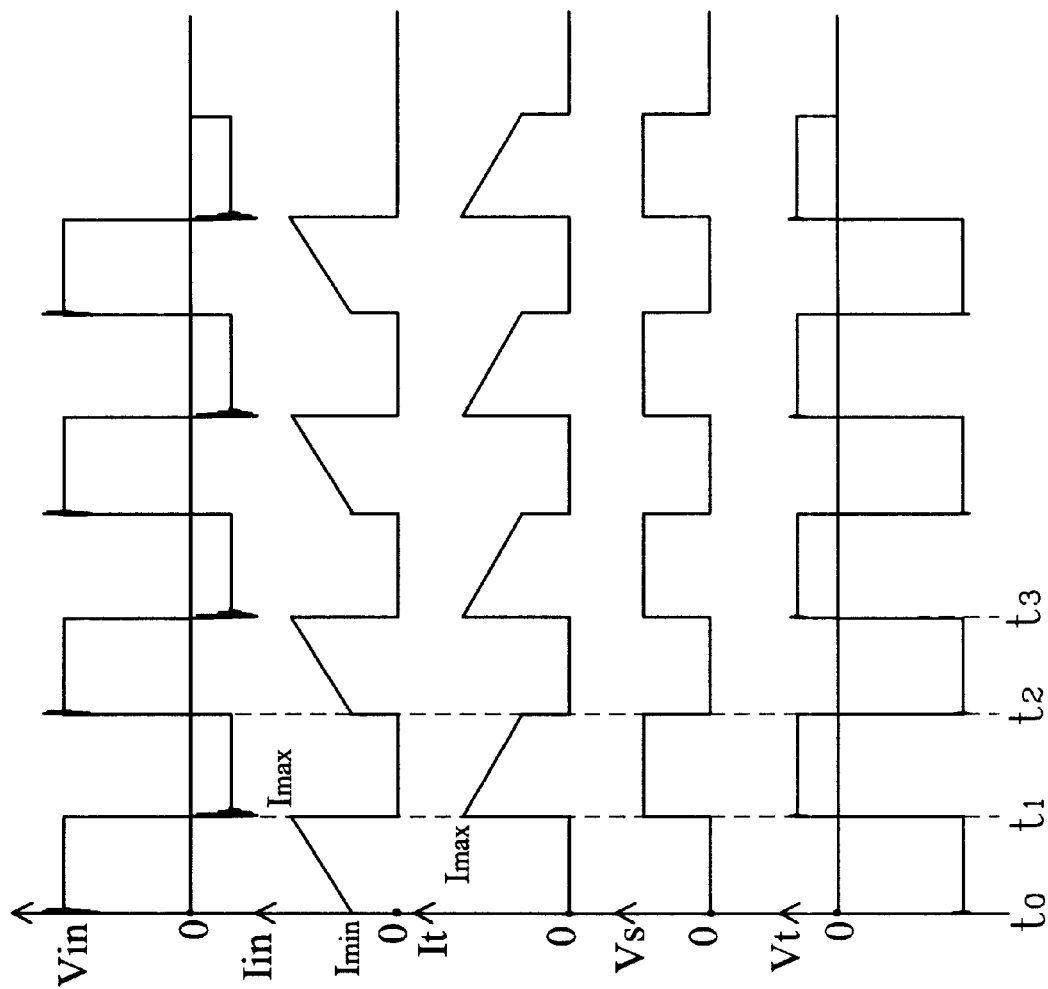
FIG. 8 is a schematic illustration of the waveforms in continuous conduction mode (CCM) corresponded to the main elements in FIG. 7 according to the second embodiment in the present invention.

The waveforms are shown in FIG. 8, which is a schematic illustration of the waveforms in continuous conduction mode (CCM) corresponded to the main elements in FIG. 7 according to the second embodiment in the present invention. In timing to, the voltage Vin is positive, the flyback switch circuit 200 is charging into the transformer T1. The current Iin will increase from the Imin to Imax linearly. The voltage Vt is negative to make the current $I_t$ be zero. When the timing is $t_1$, the switch S1 of the flyback switch circuit 200 is cut off, the current Iin is changed into zero. The current $I_t$ will decrease from Imax to Imin linearly. Until timing $t_2$, the flyback switch circuit 200 is charging into the transformer T1 again, the Iin will increase again, to be a cycle.

The waveforms of FIG. 8 are corresponding to the circuit elements in FIG. 7. The quickly discharging circuit for synchronous switch M1 is formed in section $t_0$–$t_1$. The Vt is negative and the current $I_t$ is zero. The current sensor 400 detect a zero current and make the synchronous rectifier 300 has no output to the buffer 310. So the gate of synchronous switch M1 has no driving signal, the M1 is in turn off state. So there is no current to the load 500 during the section $t_0$–$t_1$.

In the timing $t_1$, the switch S1 of flyback switch circuit 200 was changed from turn on into turn off state. The voltage Vt and current $I_t$ of the secondary coil of the transformer T1 were changed into high level. The current sensor 400 detected a big load current and drove the synchronous rectifier 300 to output an adjusted pulse to the buffer 310, then output the synchronous driving pulse Vs coupled to the gate of synchronous switch M1, the M1 would be turned on. In the meantime, the sub-source Vsb provided the power for Qn and Qp need. The charging current passed through D5 and C5 then to the collector of Qn, and then through the emitter of Qn into the gate electrode of M1 for charging until timing $t_2$. The quickly charging circuit (D5, C5, Qn) would promote the rising rate of the gate voltage of M1, cause the synchronous switch M1 would be turned on quickly. So the quickly charging circuit is formed in section $t_1$–$t_2$.

In the timing $t_2$, the switch S1 of flyback switch circuit 200 was changed from turn off into turn on state. The voltage Vt and current $I_t$ of the secondary coil of the transformer will change the pole and flow direction immediately. The current sensor 400 detect a zero current and make the synchronous rectifier 300 stopping output an adjusted pulse to the buffer 310. The gate of synchronous switch M1 has no driving signal, the M1 would be turned off until timing $t_3$. Although the response from the synchronous rectifier 300 to the gate of M1 would be delay, the quickly discharging circuit (D6 and C5) could provide a quickly energy released path for the synchronous switch M1 to be turned off quickly. That is the quickly discharging circuit is formed in section $t_2 - t_3$.

Figure 9:
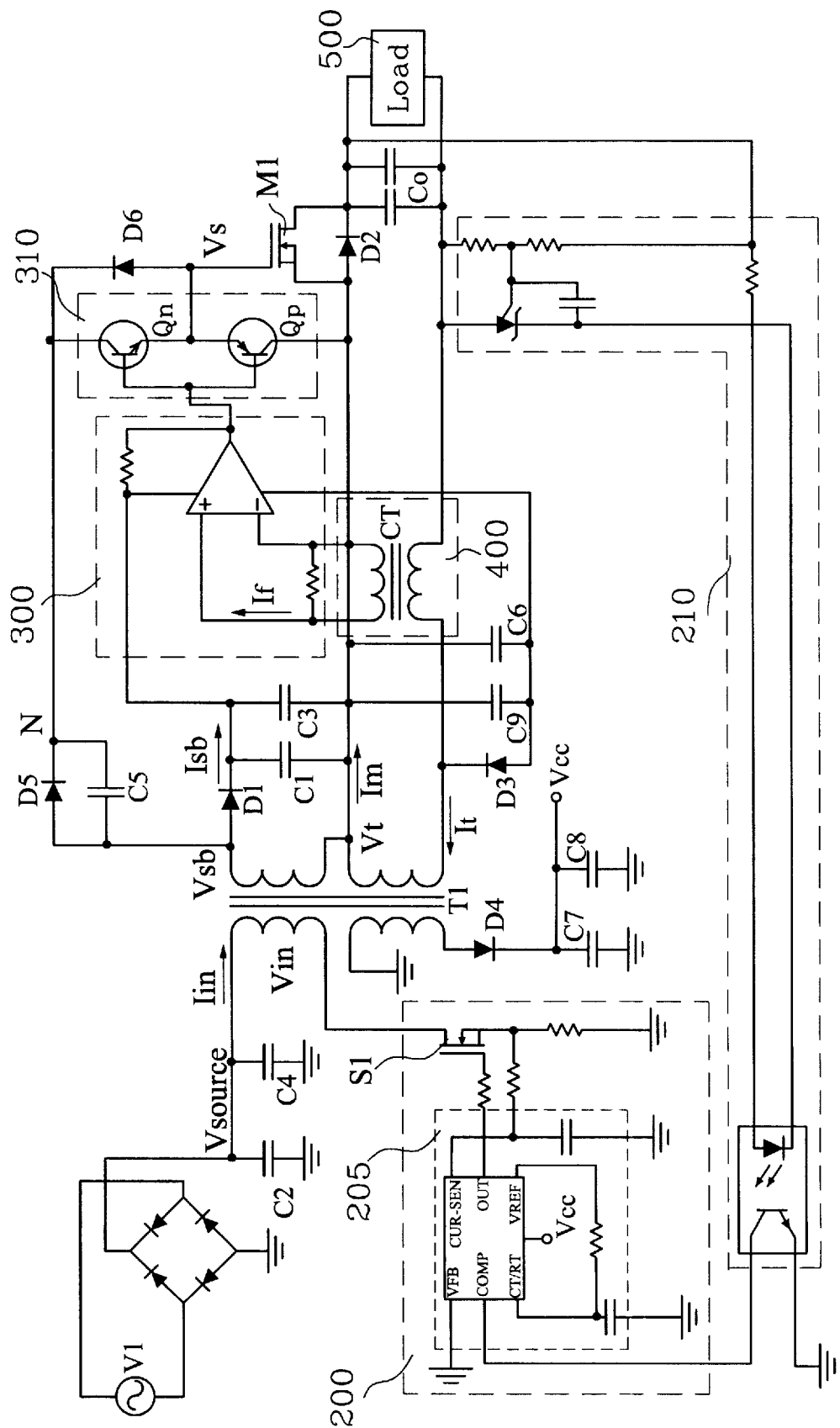
FIG. 9 is a schematic illustration of the more detail circuit elements connection corresponded to the second embodiment in the present invention.

To get more detail circuit disclosure for the second embodiment, please referring FIG. 9, is a schematic illustration of the more detail circuit element connection corresponded to the second embodiment in the present invention. It also shows the Vsource from the output of bridge rectifier that rectifying the utility power. The gate control circuit 205 also controls the switch S1 of the flyback switch circuit 200. In the second embodiment, the gate control circuit 205 can be a gate control IC as MC3844A. The gate control circuit 205 also connects with a load feedback circuit 210 for gate driving control. The second embodiment also uses a CT device to accomplish the current sensor 400, further, another way to accomplish the current sensor 400 is used the Hall effect element to detect the load current. For the synchronous switch 300, it can be a comparing IC likes as the LM311 chip.

Figure 10:
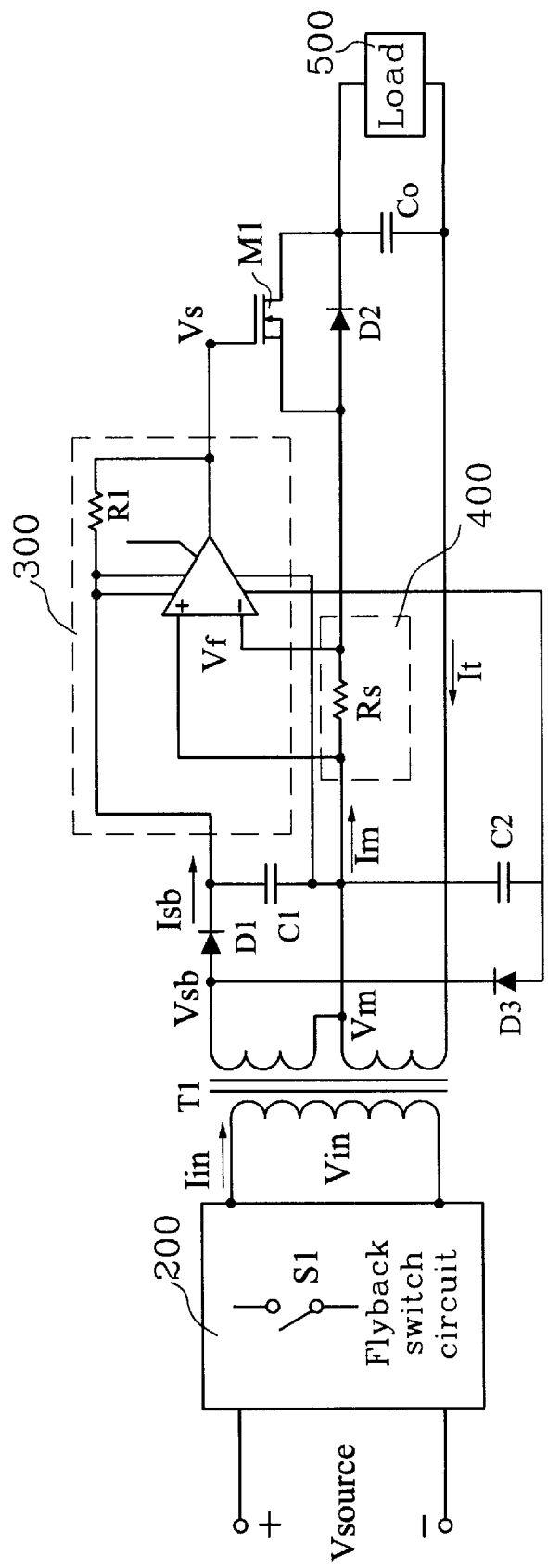
FIG. 10 is a schematic illustration of using a resistor to be the current sensor according to the first embodiment.

For preferable first embodiment, this invention could use a resistor Rs to take place of the current sensor 400 shown as FIG. 10, which is a schematic illustration of using a small resistor to be the current sensor 400 according to the first embodiment. The other circuit elements and connections are same as the circuitry in FIG. 6. The resistor Rs could be a small value resistor, for example: $0.01\Omega$. The main advantage of using the Rs to be the current sensor 400 is that the circuitry could be cost down, and the circuitry design could be simpler. That will make this invention be more potential in the power supply competition.

Figure 11:
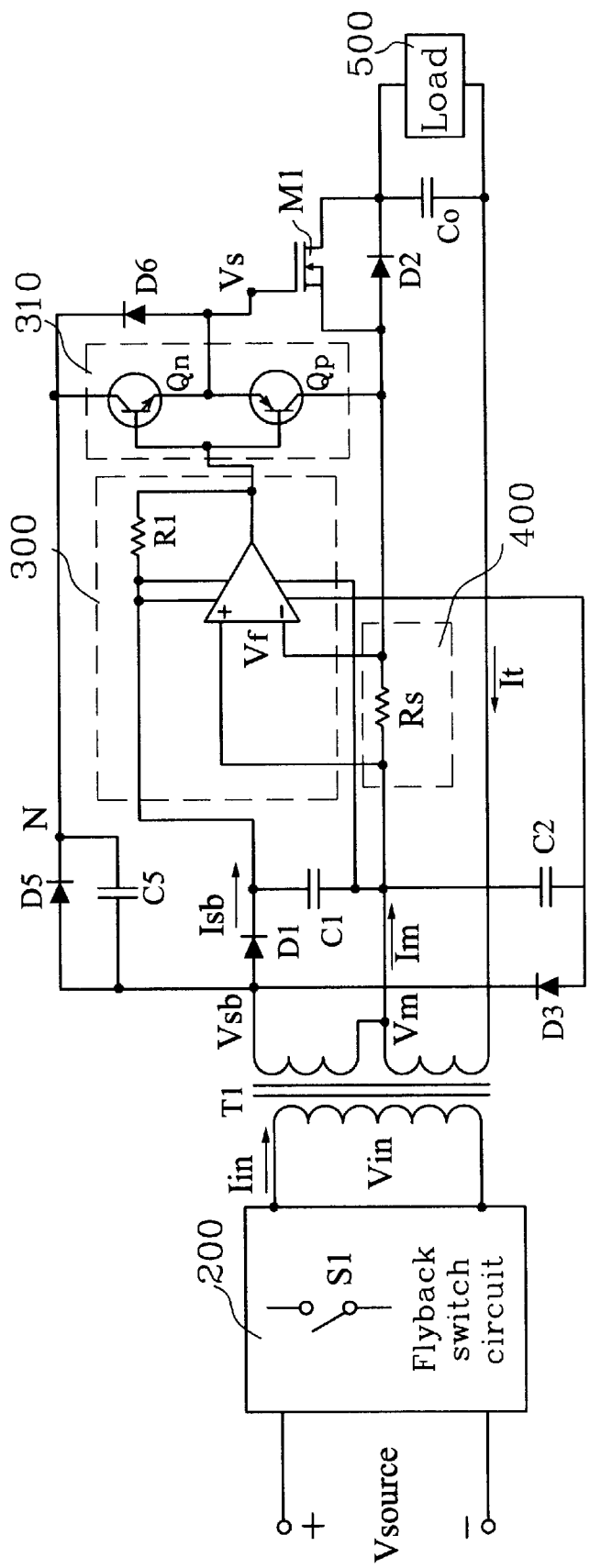
FIG. 11 is a schematic illustration of using a resistor to be the current sensor according to the second embodiment.

For another preferable second embodiment, using a resistor Rs to take place of the current sensor 400 is shown as FIG. 11, which is a schematic illustration of applying a small resistor to be the current sensor 400 according to the second embodiment. The other circuit elements and connections are same as the circuitry in FIG. 7. In the same way, the resistor Rs could be a small value resistor, for example the $0.01\Omega$. The main advantage of using the Rs to be the current sensor 400 is that the second embodiment circuitry could be cost down, further the circuitry design could be simpler. That will make this invention be more potential in the power supply competition and mass-production.

Further, in order to make sure the second embodiment in good performance, FIG. 9 of this invention has taken an experiment for a flyback converter power supply under 12V and 60W output power. The experiment result is to promote the power efficient from 83% to 88% by using the second embodiment of this invention.

While this invention has been described in connection with what is presently considered to be the most practical and preferred embodiment, it is to be understood that the invention is not limited to the disclosed embodiments, but on the contrary, it is intended to cover various modifications and equivalent arrangements included within the spirit and scope of the appended claims.

I claim:

1. A flyback converter with synchronous rectifier, comprising:

a power source;

a flyback switch circuit received the power source to output a high frequency pulse;

a transformer having a primary coil coupled to the flyback switch circuit to receive the high frequency pulse, having two secondary coil for one is master source and the other is sub-source;

a synchronous rectifier which outputs a driving pulse is coupled to the sub-source and a current sensor;

a synchronous switch received the driving pulse and parallel connected with an output diode D2;

an output diode with one side coupled to the master source, and the other side coupled to the load, the load further connected to an output capacitor in parallel;

a current sensor coupled to the load in series connection to detect the load current, and transmitted the load current into the synchronous rectifier for comparing with a preset current level to regular the driving pulse;

wherein, the current sensor detect the load current to make the synchronous rectifier output a regulated driving pulse when the output diode is on, then the synchronous switch turn on with the output diode simultaneously to bypass the current of output diode for reducing the component stress and switching loss.

2. The flyback converter with synchronous rectifier of claim 1, wherein said secondary coil of the transformer is completed to the master source and the sub-source.

3. The flyback converter with synchronous rectifier of claim 1, wherein said synchronous rectifier is achieved by using a comparator IC.

4. The flyback converter with synchronous rectifier of claim 1, wherein said synchronous switch is accomplished by using MOSFET.

5. The flyback converter with synchronous rectifier of claim 1, wherein said current sensor is accomplished by using a CT device.

6. The flyback converter with synchronous rectifier of claim 1, wherein said current sensor is accomplished by using a Hall element.

7. The flyback converter with synchronous rectifier of claim 1, wherein said current sensor is accomplished by using a resistor for detecting the load current.

8. A flyback converter with synchronous rectifier, comprising:

a power source;

a flyback switch circuit received the power source to output a high frequency pulse;

a transformer having a primary coil coupled to the flyback switch circuit to receive the high frequency pulse, having two secondary coil for one is master source Vt and the other is sub-source Vsb;

a synchronous rectifier coupled to the sub-source via a diode D1, and coupled to a current sensor to output a driving pulse;

a synchronous switch M1 received the driving pulse and parallel connected with an output diode D2;

an output diode coupled to the master source via the P pole, and the N pole of the output diode coupled to a load, the load further connected to an output capacitor in parallel;

a current sensor coupled to the load in series connection to detect the load current, and transmitted the load current into the synchronous rectifier for comparing with a preset current level to regular the driving pulse;

a promoted turn on/off path coupled between the sub-source and the gate electrode of synchronous switch and included a quickly turn on diode D5 connected with a quickly turn off diode D6, and the quickly turn on diode D5 coupled with a capacitor C5 in parallel connection;

a buffer consisted of an N-type transistor Qn connected with a P-type transistor Qp, both the base electrodes of the Qn and Qp are connected together then coupled to the output of the synchronous rectifier, both the emitter electrodes of the Qn and Qp are also connected together then coupled to Vs and to the gate electrode of synchronous switch, the collector electrode of Qn coupled to the node N to connect with the promoted turn on/off path, the collector electrode of Qp coupled to the Vt; wherein the promoted turn on path consisted of the diode D5, capacitor C5, Qn and the gate of the M1, and used to form a quickly charging circuit for the synchronous switch M1; the promoted turn off path consisted of the diode D6 and capacitor C5, and used to form a quickly discharging circuit for the synchronous switch M1.

9. The flyback converter with synchronous rectifier of claim 8, wherein said quickly charging circuit is formed when the flyback switch circuit was changed from turn on into turn off state, the voltage and current of the secondary coil of the transformer were increased immediately, the current sensor detected a large current and drove the synchronous rectifier to output an adjusted pulse coupled to the buffer, then output the synchronous driving pulse Vs coupled to the gate of synchronous switch M1; in the meantime, the sub-source Vsb provided the power for Qn and Qp, the current of the power passed through D5 and C5 then to the collector of Qn, and through the emitter of Qn into the gate electrode of M1 for charging, the quickly charging circuit would promote the rising rate of the gate voltage of M1, so the synchronous switch M1 would be turned on quickly.

10. The flyback converter with synchronous rectifier of claim 8, wherein said quickly discharging circuit is formed when the flyback switch circuit was changed from turn off into turn on state, the voltage and current of the secondary coil of the transformer would change the pole and flow direction immediately, the current sensor detect a zero current and make the synchronous rectifier stopping output an adjusted pulse to the buffer, so the gate of synchronous switch M1 has no driving signal, the M1 would be turned off; although the response from the synchronous rectifier to the gate of M1 would be delay, the quickly discharging circuit could provide a quickly energy released path for the synchronous switch M1 to be turned off quickly.

11. The flyback converter with synchronous rectifier of claim 8, wherein said current sensor is accomplished by using a resistor for detecting the load current.

* * * * *